(12) United States Patent
Bullock et al.

(10) Patent No.: US 8,943,865 B1
(45) Date of Patent: Feb. 3, 2015

(54) VEHICLE WHEEL SECURITY SYSTEM

(76) Inventors: Shawn E. Bullock, Houston, TX (US);
Stephanie M. Cevallos, Houston, TX (US)

( * ) Notice: Subject to any disclaimer, the term of this patent is extended or adjusted under 35 U.S.C. 154(b) by 0 days.

(21) Appl. No.: 13/617,015

(22) Filed: Sep. 14, 2012

Related U.S. Application Data

(60) Provisional application No. 61/534,545, filed on Sep. 14, 2011.

(51) Int. Cl.
*B60R 25/00* (2013.01)
*F16B 41/00* (2006.01)
*B60B 7/16* (2006.01)

(52) U.S. Cl.
CPC .. *B60B 7/16* (2013.01); *Y10S 70/55* (2013.01); *Y10S 70/57* (2013.01); *Y10S 292/61* (2013.01); *Y10S 411/91* (2013.01)
USPC ............ 70/225; 70/169; 70/232; 70/DIG. 55; 70/DIG. 57; 292/37; 292/177; 292/182; 292/DIG. 61; 301/37.21; 301/37.32; 411/910

(58) Field of Classification Search
USPC ........... 70/225, 226, 259, 260, 232, DIG. 57, 70/158, 163–173, 118, 120, DIG. 55; 292/37, 177, 182, DIG. 61; 301/37.21, 301/37.32, 37.33, 37.34, 37.371, 37.104, 301/37.372–37.376; 411/910
See application file for complete search history.

(56) References Cited

U.S. PATENT DOCUMENTS

| | | | |
|---|---|---|---|
| 1,643,485 A * | 9/1927 | Butters et al. .................. 70/260 |
| 1,704,910 A * | 3/1929 | Bradley .......................... 70/260 |
| 1,707,458 A * | 4/1929 | Clench ........................ 301/35.61 |
| 1,753,124 A * | 4/1930 | Lauro .............................. 70/260 |
| 1,799,462 A * | 4/1931 | Hawkins ........................ 70/260 |
| 1,851,313 A * | 3/1932 | Johnson .......................... 70/260 |
| 1,929,679 A * | 10/1933 | Duncan .......................... 70/232 |
| 2,012,735 A * | 8/1935 | Swartz ............................ 70/169 |
| 2,124,035 A | 7/1938 | Hurd |
| 2,217,775 A * | 10/1940 | Smith ............................. 70/168 |
| 2,363,567 A * | 11/1944 | Blakeman ........................ 292/6 |
| 2,399,016 A * | 4/1946 | Gits ......................... 222/153.03 |
| 2,437,674 A * | 3/1948 | Armbruster .................... 70/173 |
| 2,722,822 A | 11/1955 | Thomas |
| 2,807,157 A * | 9/1957 | McLin .......................... 70/169 |
| 2,874,561 A | 2/1959 | Alger |
| 3,170,733 A | 2/1965 | Lamme |
| 3,199,321 A * | 8/1965 | Soilenberger .................... 70/1.5 |
| 3,387,469 A * | 6/1968 | Rabinowitz .................... 70/232 |
| 3,757,550 A * | 9/1973 | Kayser ............................ 70/232 |
| 3,833,266 A * | 9/1974 | Lamme ...................... 301/37.21 |
| 3,965,708 A | 6/1976 | Smiley |
| 4,161,869 A | 7/1979 | Dixon |
| 4,171,851 A | 10/1979 | Scruggs |
| 4,346,940 A | 8/1982 | Tatar |
| 4,587,814 A * | 5/1986 | Wilson ........................... 70/232 |
| 4,622,833 A | 11/1986 | Shepherd |
| 4,683,735 A * | 8/1987 | Magrobi ........................ 70/168 |

(Continued)

*Primary Examiner* — Llyod Gall

(74) *Attorney, Agent, or Firm* — Robert C. Montgomery; Montgomery Patent & Design

(57) ABSTRACT

A locking security system for motor vehicle wheel rims comprises a security housing, a locking assembly, and a plurality of grooved lug nuts. The security housing comprises a structure which covers wheel stud portions of an existing wheel rim. The locking assembly comprises a key lock mechanism located on an interior portion of the housing further comprising a plurality of locking plates which engage respective grooved lug nuts.

8 Claims, 4 Drawing Sheets

(56) References Cited

U.S. PATENT DOCUMENTS

| | | | |
|---|---|---|---|
| 4,736,603 A * | 4/1988 | Brushaber | 70/232 |
| 4,825,669 A | 5/1989 | Herrera | |
| 4,869,084 A | 9/1989 | Mack, Jr. | |
| 4,884,422 A * | 12/1989 | Wolter | 70/165 |
| 5,097,686 A | 3/1992 | Plumer | |
| 5,494,336 A | 2/1996 | Russell | |
| 5,542,750 A | 8/1996 | FitzGerald | |
| 6,419,326 B1 | 7/2002 | Rains | |
| 2003/0051518 A1 * | 3/2003 | Thompson | 70/164 |
| 2008/0141741 A1 * | 6/2008 | Bisaillon | 70/171 |

* cited by examiner

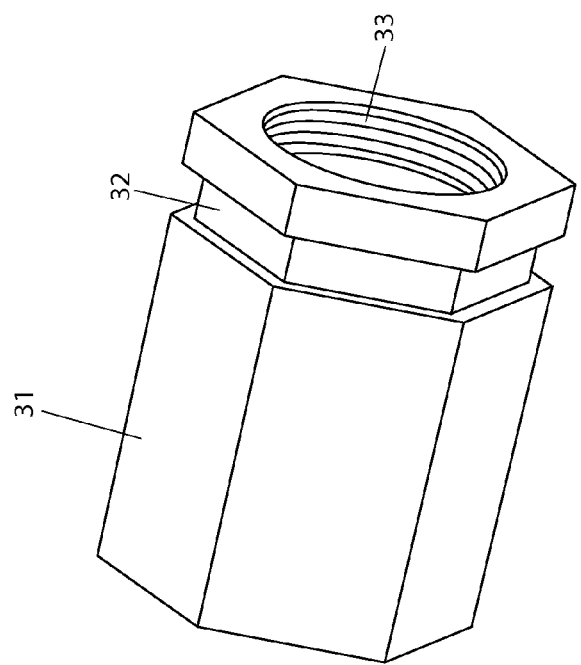
Fig. 2

VEHICLE WHEEL SECURITY SYSTEM

RELATED APPLICATIONS

The present invention was first described in and claims the benefit of U.S. Provisional Application No. 61/534,545, filed Sep. 14, 2011, the entire disclosures of which are incorporated herein by reference.

FIELD OF THE INVENTION

The presently disclosed subject matter generally relates to a locking cover plate for preventing unauthorized removal of a vehicle wheel.

BACKGROUND OF THE INVENTION

Automobiles are constantly being redesigned for higher performance and more pleasing aesthetics. The engineering and advancement of the automobile is not limited solely to the body, but includes the wheels of a vehicle as well. As the performance and construction of a wheel advances, so does the price. Unfortunately, with increased price comes a greater risk of theft. There is a strong desire to protect the unauthorized removal of wheels from a vehicle, however, most people are reluctant to cover their wheels with bulky devices or locks.

There are various devices which attempt to securely attach a wheel to a vehicle. One (1) such device is described in U.S. Pat. No. 2,124,035 to Edward P. Hurd which discloses a wheel locking device designed to be installed below a hub cap. The locking device has a central locking mechanism attached to a bolt with projections extending therefrom. Special lug nuts having a peripheral groove are supplied to three (3) wheel frame bolts. The locking mechanism is contained within a housing which also cover the three (3) special lug nuts. When the locking mechanism is rotated the projections move to engage the peripheral grooves of the lug nuts. This device only covers three (3) lug nuts and is specifically designed to fit a wheel utilizing a hub cap. Additional space is required for the projections to rotate and the device is not meant to be seen while in use.

Another attempt to address the security and aesthetics of a wheel is described in U.S. Pat. No. 6,419,326 to Douglas A. Rains. This patent discloses a locking lug nut cover also utilizing special lug nuts having a groove opposite a bolt contacting end. An annulus is used having lug nut attachments extending towards the wheel. The annulus is placed over the lug nuts and rotated until the lug nut attachments engage the groove in the lug nut. A lock is turned to rotate a projection which holds the lug nut attachments in the engaged position. This device only securely holds one of the lug nuts, while the other lug nuts are simply rotatably engaged by the lug nut attachments of the annulus. Additionally, this device has a void in the center, thus failing to truly prevent access to the center of the wheel.

Although the various devices observed may fulfill their individual, particular objectives, each device suffers from one (1) or more disadvantage or deficiency related to design or function. Whether taken singly, or in combination, none of the observed devices disclose the specific arrangement and construction of the instant invention.

SUMMARY OF THE INVENTION

The inventor has recognized the deficiencies in the art pertaining to wheel locking devices. Furthermore, the inventor has observed that there is a need for an apparatus to securely lock all of the lug nuts and prevent access to them, while at the same time doing such in an aesthetically pleasing manner.

The inventor has addressed at least one (1) of the problems observed in the art by developing a novel wheel locking device. It is a feature and aspect of the present invention to provide a wheel locking device having a cover plate, a plurality of caps and a centrally-located locking cam plate mechanically coupled to a plurality of lug nuts. Each of the plurality of caps is located at a common radial distance from a center point of the cover plate. Each cap corresponds to a lug nut securing the wheel to the wheel frame.

Another aspect of the invention provides for each of the plurality of lug nuts to comprise a head potion, thereby enabling a user to use a driving tool to engage stud on the vehicle frame for securing a wheel to the wheel frame, a locking notch annular disposed on an outer surface of the head portion, and a connecting means for connecting the lug nut to the stud.

Another aspect of the invention provides for a plurality of locking plates, each having a cam pin operably controlled by the cam plate and radiating therefrom to an individual cap. Each locking plate engages the locking notch of each lug nut within an individual cap.

In at least one (1) embodiment, the cover plate comprises a generally circular body wherein a cam plate located on a rear surface has a plurality of cam lobes and a retaining ring biasing each cam pin against an individual lobe. Use of a key drives the cam plate to synchronously drive each locking plate into the locking notch of each lug nut.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawing and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is a perspective view of a locking lug nut portion 30 of the vehicle wheel security system 10, according to the preferred embodiment;

Figure 1:
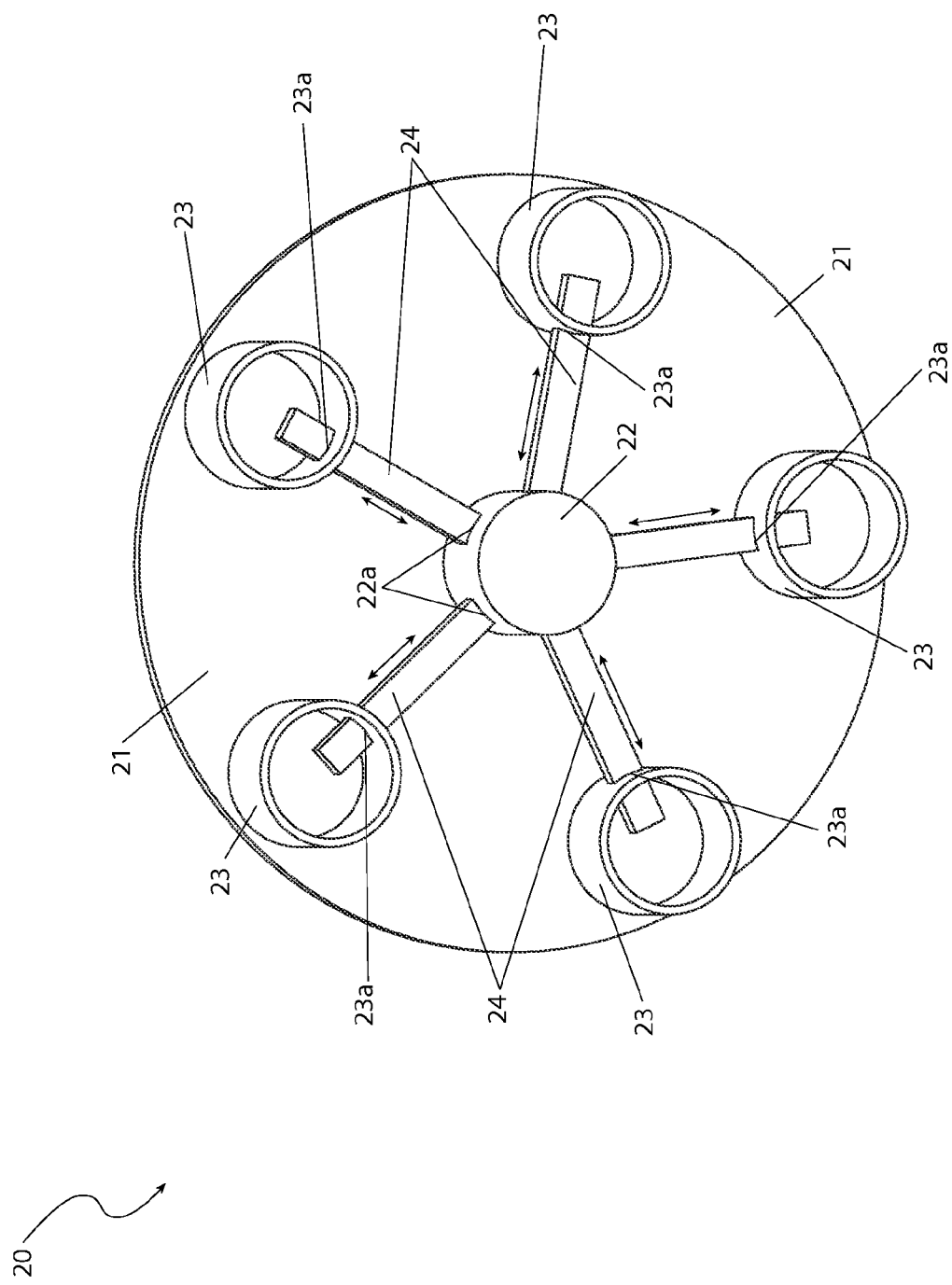
FIG. 1 is a bottom perspective view of a locking cover portion 20 of a vehicle wheel security system 10, according to a preferred embodiment.

DESCRIPTIVE KEY 10 vehicle wheel security system
20 locking cover
21 cover plate
22 locking mechanism enclosure
22a first slot 23 lug nut cap
23a second slot
24 locking plate
25 keyhole
26 key
30 locking lug nut
31 lug nut head
32 locking notch
33 threaded portion
40 cam plate
42 cam lobe
44 cam pin
46 retaining ring
100 tire/wheel assembly
101 vehicle rim
102 wheel stud

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a vehicle wheel security system (herein described as the "system") 10, which is designed for use with a variety of vehicle tire/wheel assemblies 100 providing securement of a vehicle rim portion 101 to a vehicle in a manner that requires a user to utilize a key 26 in order to access lug nuts 30 and remove the vehicle rim 101.

Referring now to FIG. 1, a bottom perspective view of a locking cover portion 20 of the system 10, is disclosed. The locking cover 20 is placed over a plurality of locking lug nuts 30 after the locking lug nuts 30 are installed upon a tire/wheel assembly 100 in a conventional manner. The locking cover 20 locks the locking lug nuts 30 in order to prevent unauthorized access to the lug nuts 30 (see FIG. 3). The components of the locking cover 20 are constructed from strong, durable, metal materials such as steel, titanium, or the like which will not bend under significant forces such as may be applied by a thief when attempting to remove the system 10. The locking cover 20 comprises a cover plate 21 and a locking mechanism enclosure 22. The cover plate 21 is a flat, preferably circular, structure with the locking mechanism enclosure 22 and lug nut caps 23 extending perpendicularly outward from a bottom surface portion. The system 10 further includes a locking mechanism enclosure 22, a cam plate 40, a retaining ring 46, a plurality of locking plates 24 extending radially from the locking mechanism enclosure 22 and driven by the cam plate 40, and a keyhole 25 (see FIG. 3) for receiving a key 26 that is used to operate the cam plate 40. The cam plate 40 is encased within the locking mechanism enclosure 22 and is a key-driven structure rotatingly affixed to a bottom face of the cover plate 21 (also see FIG. 4). Each locking plate 24 is operably connected to the cam plate 40 and extends radially from the cam plate 40, thereby protruding through a set of first slots 22a disposed on the locking mechanism enclosure 22. Also disposed on a bottom surface of the cover plate 21 is a plurality of lug nut caps 23, where the number of lug nut caps 23 corresponds with the number of locking plates 24 and each individual lug nut cap 23 is positioned to be in radial alignment with a locking plate 24 extending from the locking mechanism enclosure 22. Each lug nut cap 23 comprises a hollow cylinder with an open end. The lug nut caps 23 are further positioned so as to correspond with respective positions of the locking lug nuts 30 installed upon the existing wheel stud portions 102 of the vehicle such that the lug nut caps 23 can be simultaneously placed over head portions 31 of said locking lug nuts 30 (see FIG. 3).

Each lug nut cap 23 is provided with a second slot 23a, which enables a locking plate 24, of which it is in radial alignment with, to extend through and permits traverse motion of that locking plate 24 through a cross sectional area of the hollow interior of the lug nut cap 23 when the cam plate 40 is acted upon. As the cam plate 40 is acted upon by the insertion of the key 26 into the keyhole 25 and subsequent turning of the key 26, each locking plate 24 simultaneously and synchronously motions in either a centripetal or countercentripetal direction. The locking mechanism enclosure 22 encases the cam plate 40 and is configured to retain the cam plate 40 onto the cover plate 21 but enable rotational motion thereof, thereby acting as a containment drum therefor. A key 26 inserted through the keyhole enables a user to impart rotational motion onto the cam plate 40. Although shown here having five (5) lug nut caps 23, it is understood that other numbers and configurations of lug nut caps 23 may be utilized which correspond to a desired size and configuration of an existing vehicle rim 101.

Rotation of a key 26 within a keyhole portion 25 of the locking cover 20 provides outward motioning of a plurality of locking plates 24 which in turn engage the locking lug nuts 30 to secure the system 10 in place. A proximal end of each locking plate 24 is disposed through a correspondingly sized first slot 22a located along a side surface of the locking mechanism enclosure 22 and a distal end of each locking plate 24 is disposed through a correspondingly sized second slot 23a located along a side surface of a respective lug nut cap 23. The locking plate 24 is horizontally motioned within the slots 22a, 23a and lug nut cap 23 when the user actuates the key 26 (also see FIG. 3).

Referring now to FIG. 2, a perspective view of a locking lug nut portion 30 of the system 10, is disclosed. The system 10 utilizes a plurality of locking lug nuts 30 which correspond to a number of existing wheel stud portions 102 which protrude outwardly from the vehicle rim 101. Each locking lug nut 30 comprises a hexagonal head portion 31, an annular locking notch portion 32, and an internal female threaded portion 33. The lug nut head 31 is preferably a common hexagonal head which may be rotated using a conventional lug nut wrench or similar tool. The locking notch 32 comprises a circular slot having a rectangular cross-section with a width slightly greater than the thickness of a locking plate 24, which extends around a perimeter portion of the lug nut head 31. The threaded portion 33 of each lug nut 30 comprises a female fastener which correspondingly engages an existing wheel stud portion 102 of the vehicle to fasten the tire/wheel assembly 100 to the vehicle in a conventional manner (also see FIG. 3).

Figure 3:
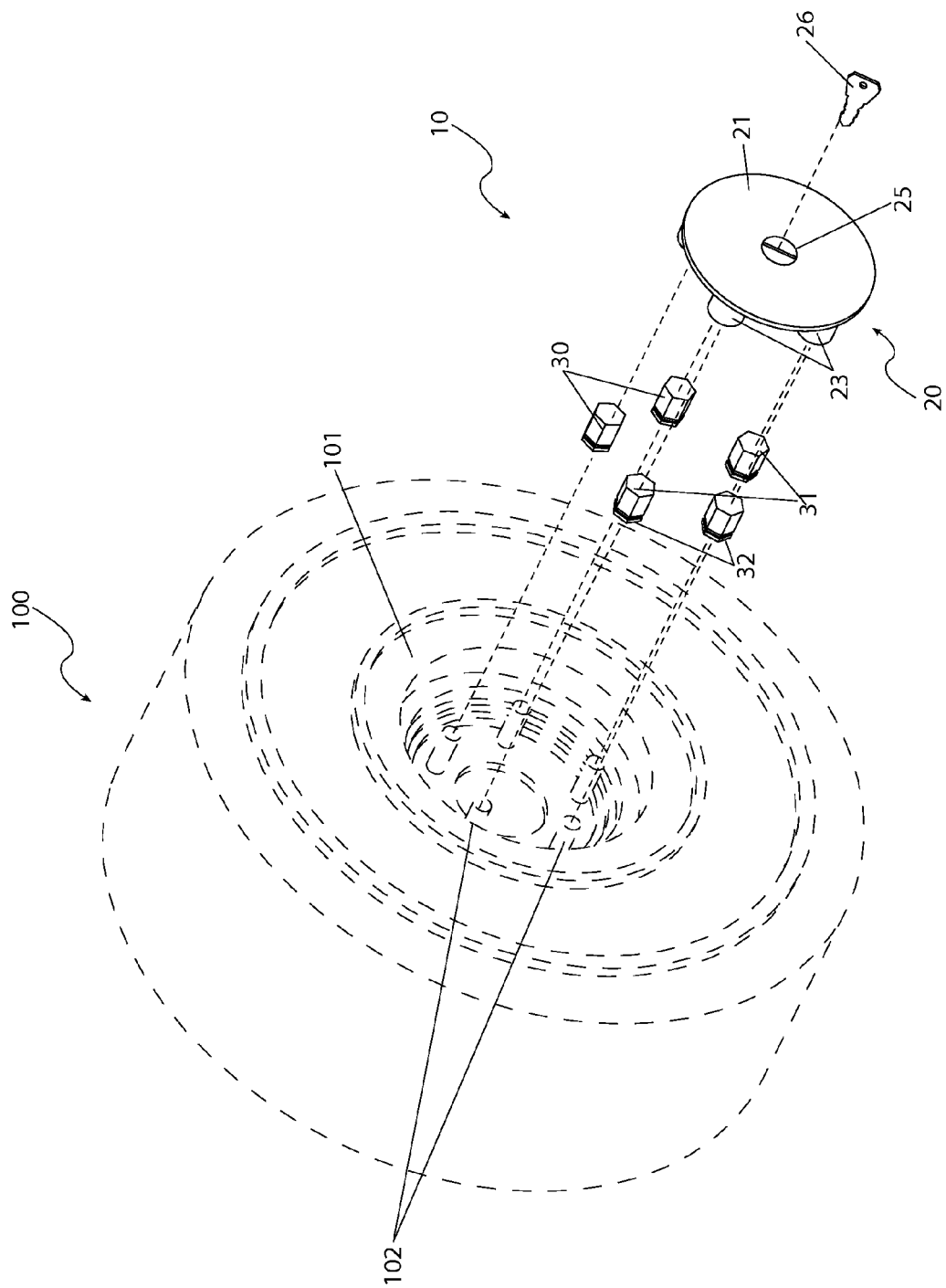
FIG. 3 is an exploded view of the vehicle wheel security system 10 installed upon a vehicle tire/wheel assembly 100, according to the preferred embodiment; and, FIG. 4 is a cut-away view of a locking cover portion 20 of the vehicle wheel security system 10, according to a preferred embodiment.

Referring now to FIG. 3, an exploded view of the system 10 being installed upon a tire/wheel assembly 100, is disclosed. A user installs the locking lug nuts 30 onto respective wheel stud portions 102 which protrude from a vehicle rim 101, and tightens the lug nuts 30 by utilizing a lug wrench or similar tool upon the lug nut heads 31. The user then places the locking cover 20 over the lug nut heads 31 such that each lug nut head 31 is covered by one (1) of the lug nut caps 23. When the lug nut caps 23 are flush against the vehicle rim 101, the locking plates 24 will be at a position adjacent the respective notch portions 32 of the corresponding locking lug nuts 30. The user can then insert the key 26 into the keyhole 25 of the locking mechanism enclosure 22 and turn the key 26 to actuate the locking cover 20 to motion the locking plates 24 outwardly, thereby engaging each lug nut notch 32 with the corresponding locking plate 24. This engagement prevents the locking cover 20 from being removed. Once the system 10 is in place, existing wheel covers, if the vehicle is so equipped, may be installed over the cover plate 21 in a conventional manner to conceal the system 10.

Figure 4:
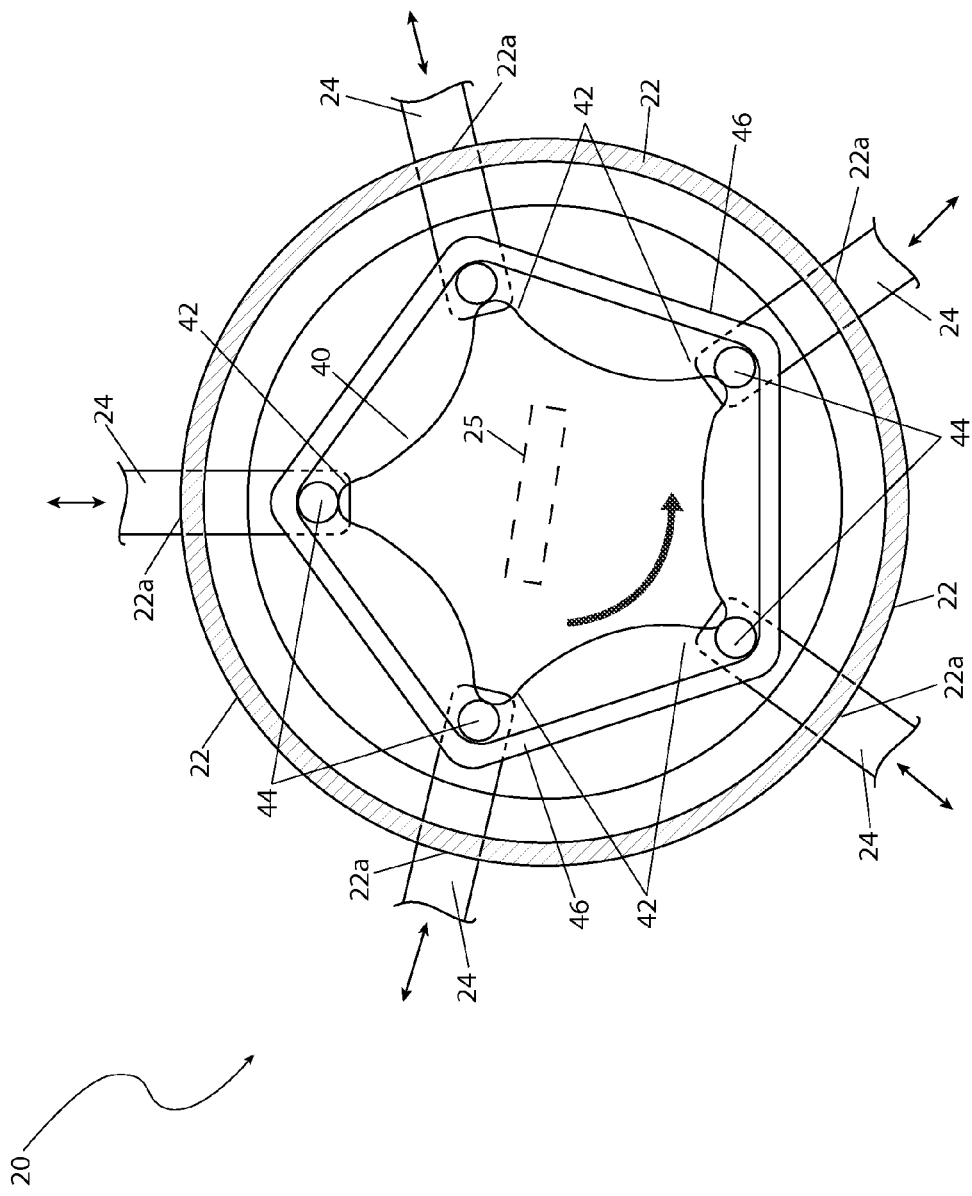

Referring now to FIG. 4, a cut-away view of a locking cover portion 20 of the system 10, according to a preferred embodiment, is disclosed. An inner circular surface portion of the locking mechanism enclosure 22 has been cut away for illustration sake to better view the cam plate 40, and a retaining ring 46. As described earlier, the locking cover 20 comprises a plurality of locking plates 24 being arranged radially in an equally-spaced manner. Each locking plate 24 comprises a flat, durable rectangular structure which is in mechanical communication with the cam plate 40 via insertion through a correspondingly shaped first slot portion 22a formed into a side surface of the locking mechanism enclosure 22. Each locking plate 24 further comprises an integral cam pin portion 44 which is in turn acted upon by an integral cam lobe portion 42 of the cam plate 40. The cam plate 40 enables inserting engagement of the key 26 through the keyhole 25, thereby allowing rotation of said cam plate 40 and integral cam lobe portions 42 along a perimeter edge which in turn press outwardly upon the respectively located cam pin portions 44 to synchronously motion the locking plates 24 outwardly resulting in the previously described engagement with the locking lug nuts 30 (see FIG. 2). The cam plate 40 is rotatingly attached to the locking mechanism enclosure 22. Insertion of the key 26 through the keyhole 25 enables a user to impart rotational motion to the cam plate 40 by turning the key in a clockwise or counterclockwise direction. Additionally, the cam pins 44 are acted upon by an encompassing rubber retaining ring 46 which circumscribes the cam pins 44. The retaining ring 46 is envisioned to be similar in construction to a common flexible "O"-ring device. Additional rotation of the key 26 and the cam plate 40 motions the cam lobes 42 away from said cam pins 44, thereby allowing retraction of said cam pins 44 by the retaining ring 46. This subsequently causes the locking plates 24 to motion toward the locking mechanism enclosure 22, thereby providing disengagement with the locking lug nuts 30, which permits removal of the locking cover 20. It is envisioned that upon removal of the key 26 from the locking cover 20, the corresponding orientation of the cam plate 40 and locking plates 24 are to be retained until the key 26 is once again utilized to actuate the system 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIG. 3.

The method of installing and utilizing the system 10 may be achieved by performing the following steps: procuring a model of the system 10 having particularly positioned lug nut caps 23 which correspond to the wheel stud portions 102 of a desired vehicle rim 101; obtaining a corresponding number of locking lug nuts 30 having a size which corresponds to said wheel studs 102; installing the vehicle rim 101 onto the vehicle utilizing the locking lug nuts 30 and a lug wrench; placing the locking cover 20 against the rim 101 such that the lug nut caps 23 cover each of the lug nut heads 31; inserting the key 26 into the keyhole 25 and turning said key 26 to motion the cam plate 40 and subsequently the locking plates 24 outwardly until the locking plates 24 engage the corresponding lug nut notch portions 32 of the locking lug nuts 30; withdrawing the key 26 to retain and lock the cover 20 in place so that the locking lug nuts 30 cannot be accessed and removed; repeating this process upon the remaining tire/wheel assemblies 100 to provide similar security; and, benefiting from a compact key-operated means to secure tire/wheel assemblies 100 upon a vehicle afforded a user of the present invention 10.

The system 10 is intended to provide various benefits to a user over existing methods of securing a vehicle's rim 101. The system 10 can be adapted to fit a variety of tire/wheel assembly 100 sizes and configurations. The system 10 can be quickly removed only by a user who has an appropriate key 26 and cannot be removed by a thief. The system 10 can be quickly reinstalled after it is removed. The system 10 can be utilized in conjunction with existing tire/wheel assemblies 100 and existing wheel covers.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A security device adapted for placement on a vehicle wheel, comprising:
   a cover plate, comprising a first surface and a second surface;
   a locking mechanism enclosure extending outwardly from a central location of said first surface of said cover plate, wherein said locking mechanism enclosure is provided with a plurality of first slots;
   a plurality of locking plates having a first end and a second end, each having a cam pin located at said first end;
   a cam plate housed within said locking mechanism enclosure and rotatingly engaged with said cover plate, comprising a plurality of cam lobes about a perimeter thereof; and,
   a flexible retaining ring housed within said locking mechanism enclosure;
   wherein a cam pin from a locking plate is mechanically engaged with a cam lobe and said flexible retaining ring encompasses each of said cam pins such that each cam pin is disposed directly between said flexible retaining ring and each cam lobe;

wherein said flexible retaining ring biases said plurality of cam pins against said plurality of cam lobes; and, wherein each locking plate extends radially from said locking mechanism cam plate and each individual locking plate extends through a first slot of said locking mechanism enclosure;

a keyhole located on said cover plate second surface, wherein said keyhole is configured to receive an ancillary key and enable rotation of said cam plate by rotation of said ancillary key after insertion into said keyhole;

a plurality of lug nut caps extending outwardly from said first surface of said cover plate, wherein:

each lug nut cap further comprises a hollow cylinder with an open end;

each lug nut cap is located at a common radial distance from a center point of said cover plate and is provided with a second slot;

said second end of each locking plate is configured to insert into and traverse an individual second slot; and, each individual lug nut cap is configured to cover an individual ancillary lug nut of said vehicle wheel;

wherein an individual locking plate is routed through an individual first slot and an individual second slot;

wherein said cover plate is adapted to be placed over and provide a locking securement to a plurality of lug nuts installed on said vehicle wheel;

wherein said rotation of said cam plate by said ancillary key forces each locking plate to motion in counter-centripetal direction so that each second end of each locking plate synchronously engage each ancillary lug nut; and, wherein further rotation of said cam plate by said ancillary key forces each locking plate to motion in a centripetal direction so that each second end of each locking plate synchronously disengages each ancillary lug nut.

2. The device of claim 1, wherein said cover plate is a generally circular structure.

3. A security system adapted for placement on a vehicle wheel, comprising:

a plurality of lug nuts, each adapted to threadingly engage a wheel stud of said vehicle wheel;

a cover plate, comprising a first surface and a second surface;

a locking mechanism enclosure extending outwardly from a central location of said first surface of said cover plate, wherein said locking mechanism enclosure is provided with a plurality of first slots;

a plurality of locking plates having a first end and a second end, each having a cam pin located at said first end;

a cam plate housed within said locking mechanism enclosure and rotatingly engaged with said cover plate, comprising a plurality of cam lobes about a perimeter thereof; and, a flexible retaining ring housed within said locking mechanism enclosure;

wherein a cam pin from a locking plate is mechanically engaged with a cam lobe and said flexible retaining ring encompasses each of said cam pins such that each cam pin is disposed directly between said flexible retaining ring and each cam lobe;

wherein said flexible retaining ring biases said plurality of cam pins against said plurality of cam lobes; and, wherein each locking plate extends radially from said cam plate and each individual locking plate extends through a first slot of said locking mechanism enclosure;

a keyhole located on said cover plate second surface, wherein said keyhole is configured to receive an ancillary key and enable rotation of said cam plate by rotation of said ancillary key after insertion into said keyhole;

a plurality of lug nut caps extending outwardly from said first surface of said cover plate, wherein:

each lug nut cap further comprises a hollow cylinder with an open end;

each lug nut cap is located at a common radial distance from a center point of said cover plate and is provided with a second slot;

said second end of each locking plate is configured to insert into and traverse an individual second slot; and, each individual lug nut cap is configured to cover an individual lug nut;

wherein an individual locking plate is routed through an individual first slot and an individual second slot;

wherein said cover plate is adapted to be placed over and provide a locking securement to a plurality of lug nuts installed on said vehicle wheel;

wherein said rotation of said cam plate by said ancillary key forces each locking plate to motion in counter-centripetal direction so that each second end of each locking plate synchronously engage each lug nut; and, wherein further rotation of said cam plate by said ancillary key forces each locking plate to motion in a centripetal direction so that each second end of each locking plate synchronously disengages each lug nut.

4. The security system recited in claim 3, wherein said cover plate is a generally circular structure.

5. The security system recited in claim 3, wherein each of said plurality of lug nuts further comprises:

a head portion; and, a locking notch having a rectangular cross-section annularly disposed about an exterior surface of said head portion.

6. A security system adapted for placement on a vehicle wheel, comprising:

a key;

a plurality of lug nuts, each adapted to threadingly engage a wheel stud of said vehicle wheel;

a cover plate, comprising a first surface and a second surface;

a locking mechanism enclosure extending outwardly from a central location of said first surface of said cover plate, wherein said locking mechanism enclosure is provided with a plurality of first slots;

a plurality of locking plates having a first end and a second end, each having a cam pin located at said first end;

a cam plate housed within said locking mechanism enclosure and rotatingly engaged with said cover plate, comprising a plurality of cam lobes about a perimeter thereof; and, a flexible retaining ring housed within said locking mechanism enclosure;

wherein a cam pin from a locking plate is mechanically engaged with a cam lobe and said flexible retaining ring encompasses each of said cam pins such that each cam pin is disposed directly between said flexible retaining ring and each cam lobe;

wherein said flexible retaining ring biases said plurality of cam pins against said plurality of cam lobes; and, wherein each locking plate extends radially from said cam plate and each individual locking plate extends through a first slot of said locking mechanism enclosure;

a keyhole located on said cover plate second surface, wherein said keyhole is configured to receive said key and enable rotation of said cam plate by rotation of said key after insertion into said keyhole;

a plurality of lug nut caps extending outwardly from said first surface of said cover plate, wherein:

each lug nut cap further comprises a hollow cylinder with an open end;

each lug nut cap is located at a common radial distance from a center point of said cover plate and is provided with a second slot;

said second end of each locking plate is configured to insert into and traverse an individual second slot; and, each individual lug nut cap is configured to cover an individual lug nut;

wherein an individual locking plate is routed through an individual first slot and an individual second slot;

wherein said cover plate is adapted to be placed over and provide a locking securement to a plurality of lug nuts installed on said vehicle wheel;

wherein said rotation of said cam plate by said key forces each locking plate to motion in counter-centripetal direction so that each second end of each locking plate synchronously engage each lug nut; and, wherein further rotation of said cam plate by said key forces each locking plate to motion in a centripetal direction so that each second end of each locking plate synchronously disengages each lug nut.

7. The security system recited in claim 6, wherein said cover plate is a generally circular structure.

8. The security system recited in claim 6, wherein each of said plurality of lug nuts further comprises:

a head portion; and, a locking notch having a rectangular cross-section annularly disposed about an exterior surface of said head portion.

* * * * *